(12) United States Patent
Futamura et al.

(10) Patent No.: US 6,535,499 B1
(45) Date of Patent: Mar. 18, 2003

(54) MULTI-MODE COMMUNICATION DEVICE

(75) Inventors: Kazuhiro Futamura, Kawasaki (JP); Hideki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/164,678

(22) Filed: Oct. 1, 1998

(30) Foreign Application Priority Data

Feb. 27, 1998 (JP) .......................................... 10-047373

(51) Int. Cl.[7] .............................................. H04B 7/216
(52) U.S. Cl. ...................... 370/342; 370/335; 370/441; 370/442; 370/479; 455/552
(58) Field of Search ................................ 370/342, 347, 370/346, 441, 442, 320, 321, 337, 344, 350, 335, 315, 328, 329, 437, 465, 468, 479, 336; 455/553, 552

(56) References Cited

U.S. PATENT DOCUMENTS

| | | | | | |
|---|---|---|---|---|---|
| 4,799,252 A | * | 1/1989 | Eizenhoffer et al. | .......... | 379/59 |
| 5,319,634 A | * | 6/1994 | Bartholomew et al. | ....... | 370/18 |
| 5,345,439 A | * | 9/1994 | Marston | ....................... | 370/18 |
| 5,446,757 A | * | 8/1995 | Chang | ......................... | 375/239 |
| 5,815,525 A | * | 9/1998 | Smith et al. | ................. | 375/200 |
| 5,844,934 A | * | 12/1998 | Lund | ........................... | 375/200 |
| 5,995,533 A | * | 11/1999 | Hassan et al. | .............. | 375/200 |
| 6,035,212 A | * | 3/2000 | Rostoker et al. | ............ | 455/552 |
| 6,185,434 B1 | * | 2/2001 | Hagstrom et al. | .......... | 455/552 |

* cited by examiner

Primary Examiner—Dang Ton
Assistant Examiner—Tri Phan
(74) Attorney, Agent, or Firm—Katten Muchin Zavis Rosenman

(57) ABSTRACT

A multi-mode communication device includes a receiving unit which receives a radio signal via a radio communication path, and processes the received radio signal, a frequency-component obtaining unit which obtains frequency components in all or part of a frequency range of the received radio signal, and a controlling unit which selects a multiplex-attachment scheme appropriate for the received radio signal from a plurality of applicable multiplex-attachment schemes by controlling said receiving unit, said controlling unit selecting a CDMA scheme as the multiplex-attachment scheme when the frequency components obtained by said frequency-component obtaining unit are substantially uniformly distributed.

13 Claims, 14 Drawing Sheets

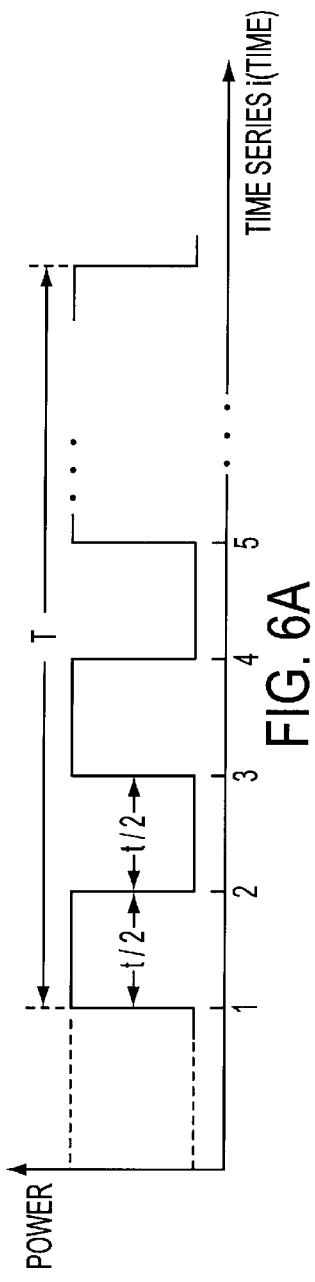
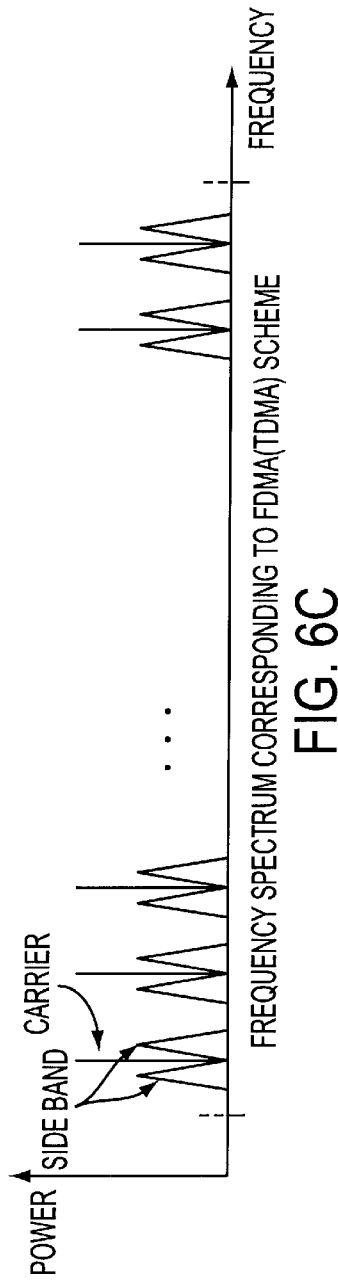
FIG. 6A
FIG. 6B
FIG. 6C

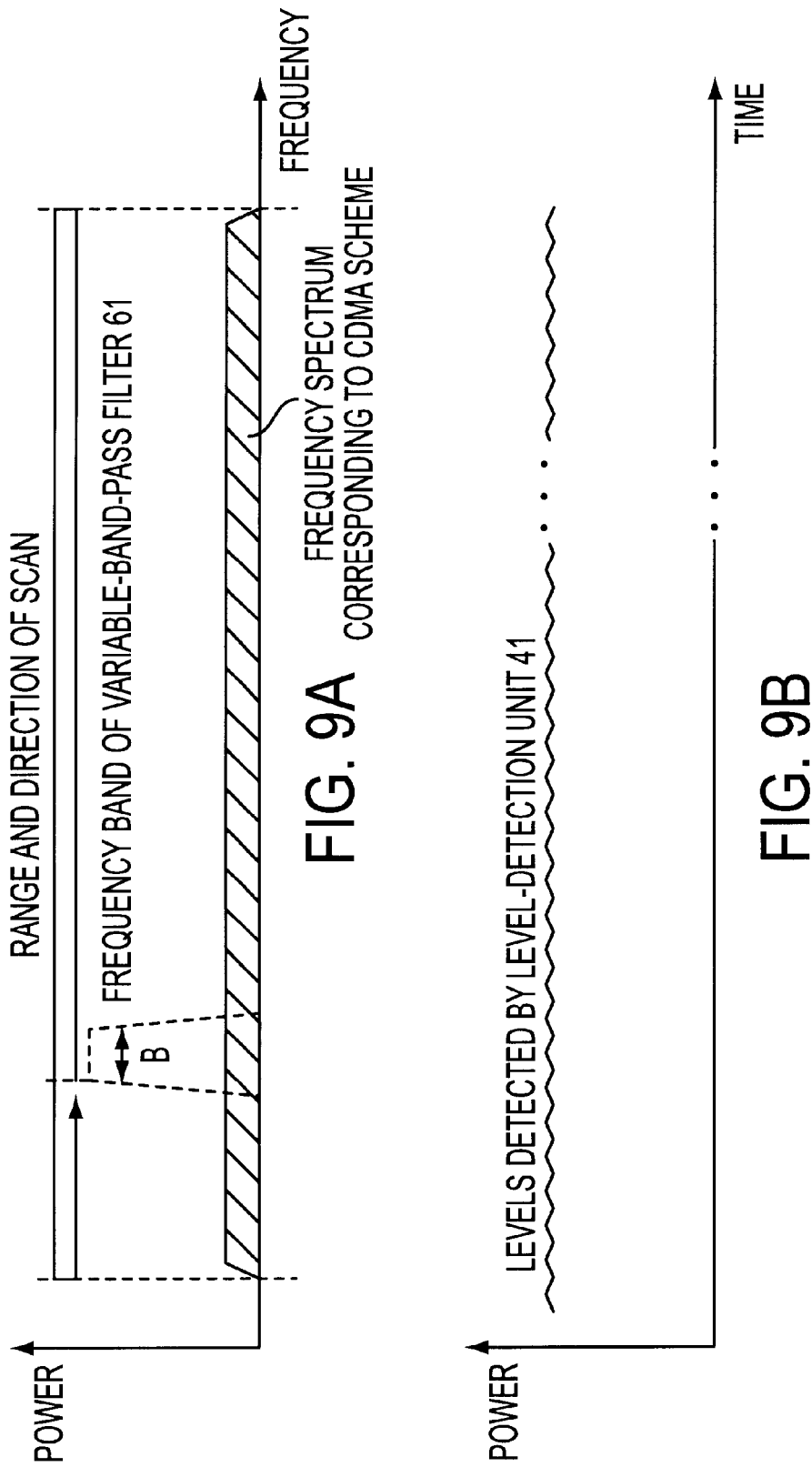

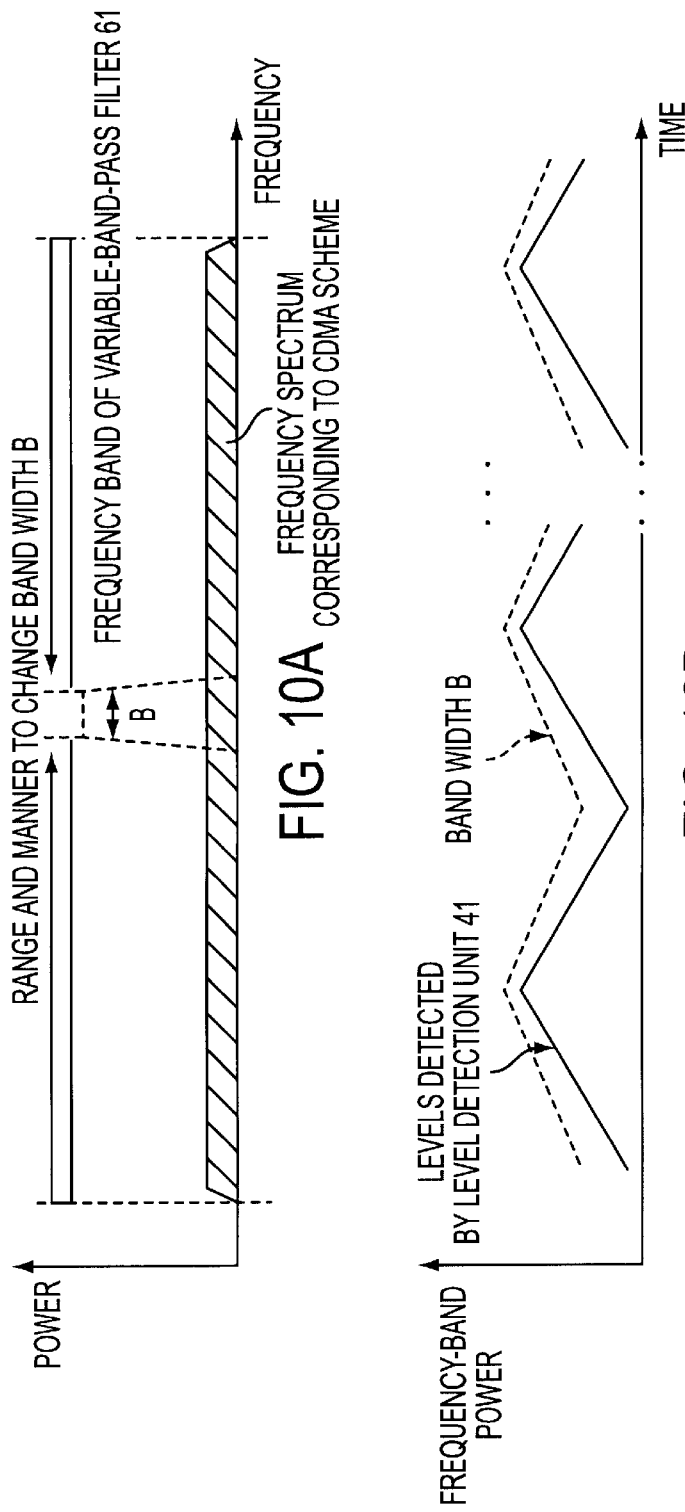
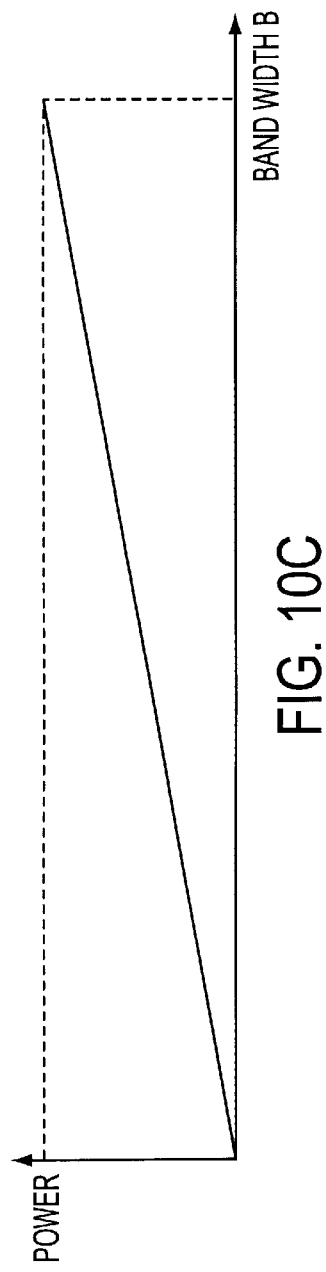
FIG. 10A
FIG. 10B
FIG. 10C

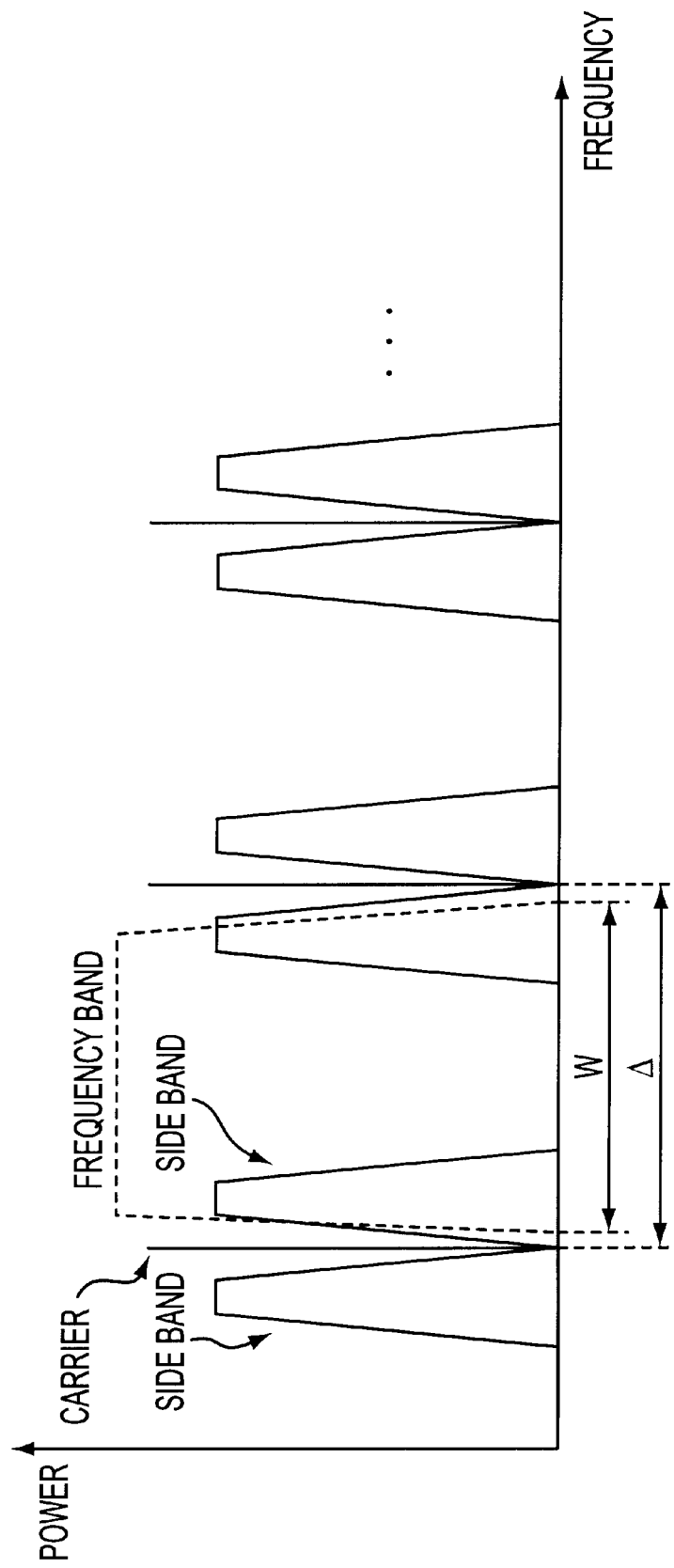

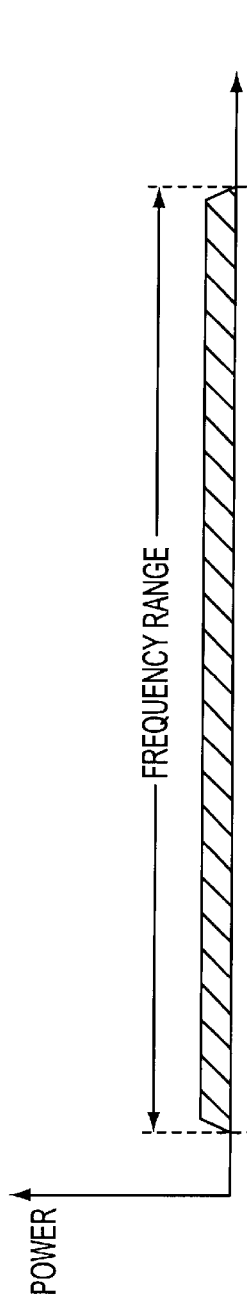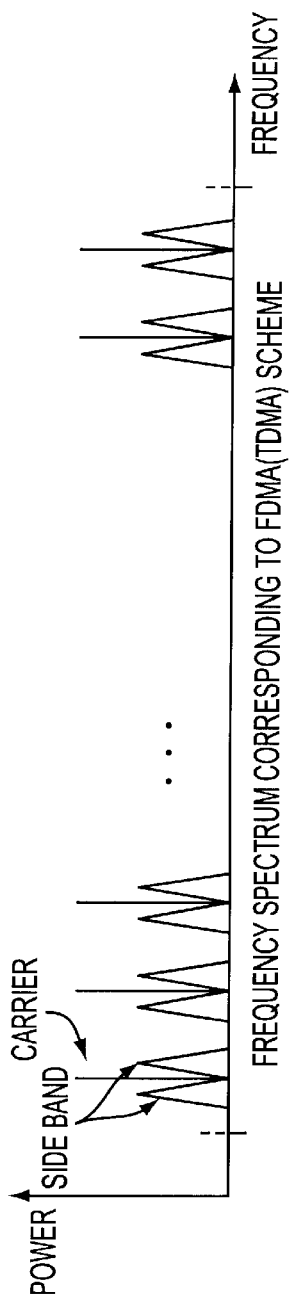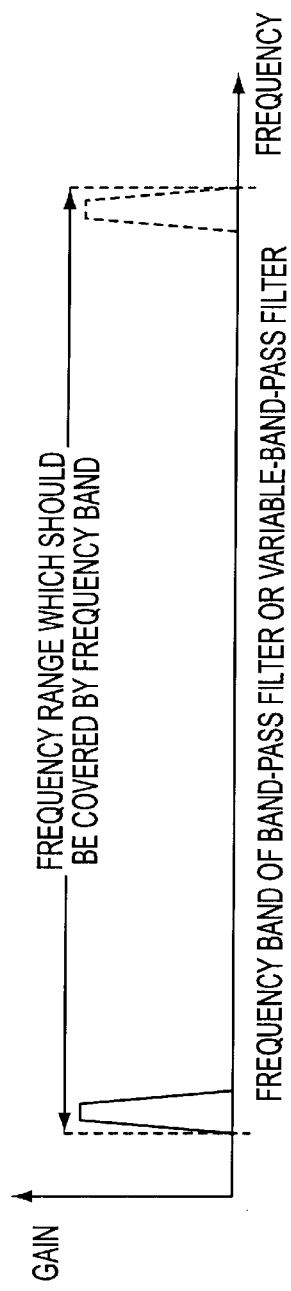

MULTI-MODE COMMUNICATION DEVICE

BACKGROUND OF THE INVENTION

1. Field of the Invention

The present invention relates to a multi-mode communication device which establishes a communication path through an application of appropriate communication control in response to a given multiplex-attachement scheme when the given multiplex-attachment scheme is selected from a plurality of multiplex-atachement schemes, inclusive of a code-division-multiplex-attachment scheme, to be employed in a radio-transmission path.

2. Description of the Related Art

Because of a recent development in electrical-power-transfer control, a code-division-multiplex-attachment scheme is now applicable to mobile-communication systems despite of the fact that lengths of radio-transmission paths and a propagation loss greatly vary in such systems. Hereinafter, code-division-multiplex-attachment scheme is referred to as a CDMA scheme.

Such mobile-communication system employing a CDMA scheme is less susceptible to interference and noise than are systems employing other multiplex attachment schemes such as a frequency-division-multiplex-attachment scheme (hereinafter, referred to as an FDMA scheme) and a time-division-multiplex-attachement scheme (hereinafter, referred to as a TDMA scheme). Use of the CDMA scheme also provides for a greater security of information, and permits recurrent use of frequency bands by allowing a number of terminals to share a broad range of frequency bands. Against such a background, research efforts are directed to a practical application of various schemes.

In mobile communication, a large portion of investment is generally directed to radio-communication stations and equipment for facilitating communication with switch systems. A mobile communication service is generally required to service a large number of terminals where these terminals are spread across a large geographical area, and have a drifting location thereof. Under such conditions, a newly installed mobile communication system is often used together with existing systems which have been in operation before the installation of the new system.

In areas where traffic is relatively small (such areas are hereinafter called non-urban areas), however, it is not justifiable to run a plurality of systems of different schemes when considering costs and other factors. In such areas, unlike in urban areas, only a new system, once installed, is generally allowed to run.

In surroundings as described above, a subscriber needs a dual-mode terminal device which is applicable to any one of the CDMA scheme, the FDMA scheme, and the TDMA scheme if the subscriber desires communication service in both the urban areas and the non-urban areas. Such dual-mode terminal devices are now gradually becoming available in the market, and are directed to combinations of major communication schemes.

FIG. 1 is a block diagram showing a configuration of a dual-mode-terminal device used in the related art.

In FIG. 1, the power-supply node of an antenna 71 is connected to an antenna node of the air-cable sharing device 72, and the air-cable sharing device 72 has a receiver output thereof supplied to a signal input of a DSP (digital signal processor) 77 via a high-frequency amplifier 73, a frequency converter 74, a middle-frequency amplifier 75, and an orthogonal demodulator 76 arranged in a series.

A signal output of the DSP 77 is supplied to a transmitter side of the air-cable sharing device 72 via a orthogonal modulator 78, a middle-frequency amplifier 79, a frequency converter 80, a frequency-band amplifier 81, and a power amplifier 82 connected in a series. A processor 83 has a first output port thereof connected to a control input of a synthesizer 84. The synthesizer 84 has two outputs which are respectively supplied to the frequency converters 74 and 80. The processor 83 has second and third output ports connected to control inputs of synthesizers 85-R and 85-T, respectively. Respective outputs of the synthesizers 85-R and 85-T are supplied to the orthogonal demodulators 76 and 78. Fourth and fifth output ports of the processor 83 are respectively connected to the control inputs of the middle-frequency amplifiers 75 and 79. The DSP 77 has an output port thereof connected to the control inputs of the frequency-band amplifier 81 and the power amplifier 82.

The middle-frequency amplifier 75 includes a switch 86-1, band-pass filters 87-F and 87-C, and a switch 86-2. The switch 86-1 receives a signal having a middle-frequency range from the frequency converter 74 directly, or indirectly after appropriate processing is applied to the signal. The band-pass filters 87-F and 87-C are provided along respective paths extending from the switch 86-1. The switch 86-2 connects an output from either the band-pass filter 87-F or 87-C to a subsequent stage. The switches 86-1 and 86-2 have a control input thereof which receives a binary signal from the fourth output port of the processor 83.

In this related-art configuration, the processor 83 instructs the DSP 77 to establish a channel in a radio-communication zone corresponding to the CDMA scheme when the terminal enters an effective range of the radio-communication zone from outside any service area or when the terminal is newly switched on. Further, the processor 83 controls the synthesizers 84, 85-R, and 85-T to generate a respective radio frequency (for example, 980 MHz, 100 MHz, and 150 MHz, respectively), which is appropriate for the established channel utilizing the CDMA scheme. Also, the processor 83 instructs the switches 86-1 and 86-2 to selectively activate a path corresponding to the band-pass filter 87-C.

The frequency converter 74 receives a radio wave from a radio-communication station (not shown) when the radio wave arrives at the antenna 71 and is forwarded via the air-cable sharing device 72 and the high-frequency amplifier 73. The frequency converter 74 generates a middle-frequency-range signal distributed around a frequency of 100 MHz. This signal corresponds to a differential between the received radio wave and a signal generated by the synthesizer 84.

The middle-frequency amplifier 75 amplifies the middle-frequency-range signal by using the band-pass filter 87-C, which has a frequency band corresponding to the band assigned to the CDMA scheme. The orthogonal demodulator 76 applies orthogonal demodulation to the middle-frequency-range signal based on a signal generated by the synthesizer 85-R. As a result, two base-band signals i and q, which are orthogonal to each other, are generated.

The DSP 77 has a build-in firmware, and applies signal processing equivalent to that of a sliding correlator in accordance with instructions given by the processor 83. As part of the process for establishing a channel, under the control of the processor 83, the DSP 77 attempts to establish synchronization between dispersed codes internally generated and a compressed phase differential of the received radio wave.

The processor 83 gives an instruction to start establishing another channel corresponding to another scheme(for example, the FDMA scheme) other than the CDMA scheme when the attempt to establish synchronization fails in view of certain criteria.

Further, an instruction is given to the switches 86-1 and 86-2 to effect amplification of the middle-frequency-range signal of the frequency converter 74 by activating the path corresponding to the band-pass filter 87-F since the band-pass filter 87-F has a frequency band corresponding to the FDMA scheme. Hereinafter, only specifically relevant matters will be described when describing operations relating to the schemes other than the CDMA scheme since such operations have little bearing on the present invention.

If the attempt to establish synchronization succeeds, the DSP 77 notifies the processor 83 of this fact, and attends to a channel-control procedure under the guidance of the processor 83. During this procedure, various processes are performed with regard to registration of a location, entry into the service area, a transition to a waiting status, a response to a received call, a transmission, and modulation/demodulation of transmitted information (including communication signals) in response to an end of the call and hand-over.

The orthogonal modulator 78 receives a signal from the synthesizer 85-T when the synthesizer 85-T generates this signal having a certain frequency (for example, 150 MHz) in accordance with the instruction given by the processor 83, and applies orthogonal modulation to the signal from the synthesizer 85-T based on the two orthogonal base-band signals i and q, thereby generating a dispersed, modulated signal having a distribution thereof around a frequency of 150 MHz. Here, there is an underlying assumption that the base-band signals indicate transmission information to be transmitted to the radio-communication station via a radio-communication path, and are generated when a dispersing process is applied.

The middle-frequency amplifier 79, the frequency converter 80, the frequency-band amplifier 81, and the power amplifier 82 apply respective processes in an order reverse to the order of corresponding processes applied by the high-frequency amplifier 73, the frequency converter 74, and the middle-frequency amplifier 75 as described above. The dispersed, modulated signal goes through these processes to become a transmission signal distributed around a frequency of 830 MHz.

The transmission signal is then transmitted to the radio-communication path via the air-cable sharing device 72 and the antenna 71, and reaches the radio-communication station. In this manner, a full-two-way communication path is established between the terminal and the base office according to the CDMA scheme.

In the related-art example described above, several tens of seconds are needed before the establishment of synchronization. For example, if a correlation calculation takes 20 msec per unit calculation, and a series of dispersed codes is comprised of 32,727 ($2^{15}$–1) bits, a maximum time period that may be needed for establishing synchronization is as long as 655 sec. Because of this, an entry into a service area in which the CDMA scheme is employed takes a lengthy time. Also, there is an undesirable delay in attempting to cope with the FDMA scheme or the TDMA scheme. Further, it is highly likely that such an attempt needs to precede a necessary processing for entry into the CDMA-scheme service area.

In order to obviate these problems, various techniques are available, including 1) using the DSP 77 to implement a plurality of sliding correlators operating in parallel with respect to different phases (different offsets), thereby completing the establishment of synchronism within such a time period as dividing the originally required time period by the number of sliding correlators;

2) applying special dispersed codes designed for establishing the synchronism; and 3) applying a series-estimation scheme by use of a tapped delay-line-matched filter.

The technique identified in 2) is likely to suffer a decline in reliability in establishing synchronism since a plurality of peaks can be found in correlation calculations between the special dispersed codes and the offsets. Such a drawback is not desirable despite a reduction in time required for establishing the synchronism.

All of the above-identified techniques result in unduly complex hardware or software (including firmware implemented in the DSP 77), and, also, are subject to restrictions in one form or another regarding power consumption, circuit density, or real-time property. Because of these, it has been difficult to apply these techniques in practice.

Accordingly, there is a need for a multi-mode communication device which can attend to effective and reliable communication control with respect to the CDMA scheme without employing unduly complex hardware.

SUMMARY OF THE INVENTION

Accordingly, it is a general object of the present invention to provide a multi-mode communication device which can satisfy the need described above.

It is another and more specific object of the present invention to provide a multi-mode communication device which can attend to effective and reliable communication control with respect to the CDMA scheme without employing unduly complex hardware.

In order to achieve the above objects according to the present invention, a multi-mode communication device includes a receiving unit which receives a radio signal via a radio communication path, and processes the received radio signal, a frequency-component obtaining unit which obtains frequency components in all or part of a frequency range of the received radio signal, and a controlling unit which selects a multiplex-attachment scheme appropriate for the received radio signal from a plurality of applicable multiplex-attachment schemes by controlling said receiving unit, said controlling unit selecting a CDMA scheme as the multiplex-attachment scheme when the frequency components obtained by said frequency-component obtaining unit are substantially uniformly distributed.

In the multi-mode communication device described above, the check as to whether the received radio signal complies to the CDMA scheme is made based on the degree to which the frequency spectrum of the received radio signal has a uniform distribution. This configuration, therefore, selects an appropriate multiplex-attachment scheme more efficiently than does the related-art configuration which cannot make a determination as to the check until an attempt to establish synchronization is finished.

According to one aspect of the present invention, the multi-mode communication device described above is such that said frequency-component obtaining unit includes a plurality of filters having frequency bands in a frequency range corresponding to the CDMA scheme such that at least one of the frequency bands and band widths thereof are different from each other, and passes the received radio signal through said plurality of filters to obtain levels of the frequency components, and wherein said controlling unit checks whether to select the CDMA scheme based on whether ratios of the respective levels of the frequency components to the band widths of the corresponding filters are substantially the same within a predetermined tolerable range.

In the device described above, the plurality of filters of which at least one of the frequency bands and the band widths is different from each other is used for checking whether the frequency spectrum of the received radio signal has a uniform distribution. The larger the number of the filters and the more uniform a distribution of the respective frequency bands within the frequency range corresponding to the CDMA scheme, the more reliable the check as to whether the CDMA scheme is an appropriate multiplex-attachment scheme.

According to another aspect of the present invention, the multi-mode communication device described above is such that all or part of said plurality of filters have a respective band width that is not equal to a multiple of a frequency interval at which radio frequencies are allocated in a multiplex-attachment scheme that is not the CDMA scheme.

In the device described above, when the received radio signal complies to a multiplex-attachment scheme that is not the CDMA scheme, either some radio frequencies are not covered but side bands thereof are covered or some radio frequencies are covered but side bands thereof are not covered. In the case of the multiplex-attachment scheme that is not the CDMA scheme, therefore, the fact that the distribution of the frequency spectrum of the side bands is not uniform is positively utilized, thereby enhancing the reliability of the check in discriminating the CDMA scheme from another multiplex-attachment scheme.

According to another aspect of the present invention, the multi-mode communication device described above is such that all or part of said plurality of filters have a respective band width in which a number of first radio frequencies allocated to a given zone is different from a number of second radio frequencies not allocated to the given zone when the first and second radio frequencies together constitute a frequency arrangement of a multiplex-attachment scheme that is not the CDMA scheme.

In the device described above, when the received radio signal complies to a multiplex-attachment scheme that is not the CDMA scheme, a proportion of frequency components does not stay constant with respect to the side bands. Therefore, the fact that the distribution of the frequency spectrum of the side bands is not uniform is positively utilized, thereby enhancing the reliability of the check in discriminating the CDMA scheme from another multiplex-attachment scheme.

According to another aspect of the present invention, the multi-mode communication device described above is such that all or part of said plurality of filters have a respective band width which covers side bands of radio frequencies used by a multiplex-attachment scheme that is not the CDMA scheme, but does not cover the radio frequencies themselves.

In the device described above, when the received radio signal complies to a multiplex-attachment scheme that is not the CDMA scheme, only the side-band frequency components which do not have a uniform distribution are covered. Therefore, the check for discriminating the CDMA scheme from another multiplex-attachment scheme is reliably made since the CDMA scheme generally has a uniform distribution of frequency spectrum within a range it occupies.

According to another aspect of the present invention, the multi-mode communication device described above is such that the frequency bands of said plurality of filters together cover an entirety of frequency range which is shared by said plurality of applicable multiplex-attachment schemes.

In the device described above, when the received radio signal complies to the CDMA scheme, the check is made with respect to the entirety of the frequency range that the CDMA scheme occupies. Reliability of the check is thus enhanced compared to when the check is performed only with respect to a portion of the frequency range.

According to another aspect of the present invention, the multi-mode communication device described above is such that all or part of said plurality of filters are used in establishing synchronism for the CDMA scheme.

Since filters of one kind or another are necessary for establishing synchronism for the CDMA scheme even in the related-art configuration, the device described above can minimize the amount of additional hardware by utilizing the same filters for the different purposes. Therefore, consideration for cost, power consumption, a mechanical size, thermal design, etc., does not impose much restriction.

According to one aspect of the present invention, the multi-mode communication device described at the beginning is such that said frequency-component obtaining unit includes at least one filter, of which at least one of a frequency band and a band width is variable, and passes the received radio signal through said at least one filter, and wherein said controlling unit changes at least one of the frequency band and the band width of said at least one filter within a frequency range corresponding to the CDMA scheme to obtain respective levels of the frequency components, and checks whether to select the CDMA scheme based on whether the respective levels of the frequency components indicate a substantially uniform distribution of the frequency components.

In the device described above, the at least one filter of which at least one of the frequency band and the band width is different from each other is used for checking whether the frequency spectrum of the received radio signal has a uniform distribution. The larger the number of the varied frequency bands and the more uniform a distribution of the varied frequency bands within the frequency range corresponding to the CDMA scheme, the more reliable the check as to whether the CDMA scheme is an appropriate multiplex-attachment scheme.

According to another aspect of the present invention, the multi-mode communication device described above is such that said controlling unit sets the band width of said at least one filter to be not equal to a multiple of a frequency interval at which radio frequencies are allocated in a multiplex-attachment scheme that is not the CDMA scheme.

In the device described above, when the received radio signal complies to a multiplex-attachment scheme that is not the CDMA scheme, either some radio frequencies are not covered but side bands thereof are covered or some radio frequencies are covered but side bands thereof are not covered. In the case of the multiplex-attachment scheme that is not the CDMA scheme, therefore, the fact that the distribution of the frequency spectrum of the side bands is not uniform is positively utilized, thereby enhancing the reliability of the check in discriminating the CDMA scheme from another multiplex-attachment scheme.

According to another aspect of the present invention, the multi-mode communication device described above is such that said controlling unit sets the band width of said at least one filter to such a band width in which a number of first radio frequencies allocated to a given zone is different from a number of second radio frequencies not allocated to the given zone when the first and second radio frequencies together constitute a frequency arrangement of a multiplex-attachment scheme that is not the CDMA scheme.

In the device described above, when the received radio signal complies to a multiplex-attachment scheme that is not the CDMA scheme, a proportion of frequency components does not stay constant with respect to the side bands. Therefore, the fact that the distribution of the frequency spectrum of the side bands is not uniform is positively utilized, thereby enhancing the reliability of the check in discriminating the CDMA scheme from another multiplex-attachment scheme.

According to another aspect of the present invention, the multi-mode communication device described above is such that said controlling unit sets the band width of said at least one filter such that the band width covers side bands of radio frequencies used by a multiplex-attachment scheme that is not the CDMA scheme, but does not cover the radio frequencies themselves.

In the device described above, when the received radio signal complies to a multiplex-attachment scheme that is not the CDMA scheme, only the side-band frequency components which do not have a uniform distribution are covered. Therefore, the check for discriminating the CDMA scheme from another multiplex-attachment scheme is reliably made since the CDMA scheme generally has a uniform distribution of frequency spectrum within a range it occupies.

According to another aspect of the present invention, the multi-mode communication device described above is such that said controlling unit changes at least one of the frequency band and the band width of said at least one filter so as to cover in effect an entirety of a frequency range which is shared by said plurality of applicable multiplex-attachment schemes.

In the device described above, when the received radio signal complies to the CDMA scheme, the check is made with respect to the entirety of the frequency range that the CDMA scheme occupies. Reliability of the check is thus enhanced compared to when the check is performed only with respect to a portion of the frequency range.

According to another aspect of the present invention, the multi-mode communication device described above is such that said at least one filter is used in establishing synchronism for the CDMA scheme.

Since filters of one kind or another are necessary for establishing synchronism for the CDMA scheme even in the related-art configuration, the device described above can minimize the amount of additional hardware by utilizing the same filters for the different purposes. Therefore, consideration for cost, power consumption, a mechanical size, thermal design, etc., does not impose much restriction.

Other objects and further features of the present invention will be apparent from the following detailed description when read in conjunction with the accompanying drawings.

BRIEF DESCRIPTION OF THE DRAWINGS

FIGS. 6A through 6C are illustrative drawings for explaining operations of the embodiment of FIG. 5;

FIGS. 9A and 9B are illustrative drawings for explaining operation of the embodiment of FIG. 8;

FIGS. 10A through 10C are illustrative drawings showing an example in which the frequency band of a variable-band-pass filter is changed;

FIG. 13 is an illustrative drawing showing a setting of the frequency band; and

FIGS. 14A through 14C are illustrative drawings showing a configuration in which the frequency band covers a frequency range covered by the CDMA scheme and the FDMA (CDMA) scheme.

DESCRIPTION OF THE PREFERRED EMBODIMENTS

In the following, a principle and embodiments of the present invention will be described with reference to the accompanying drawings.

Figure 2:
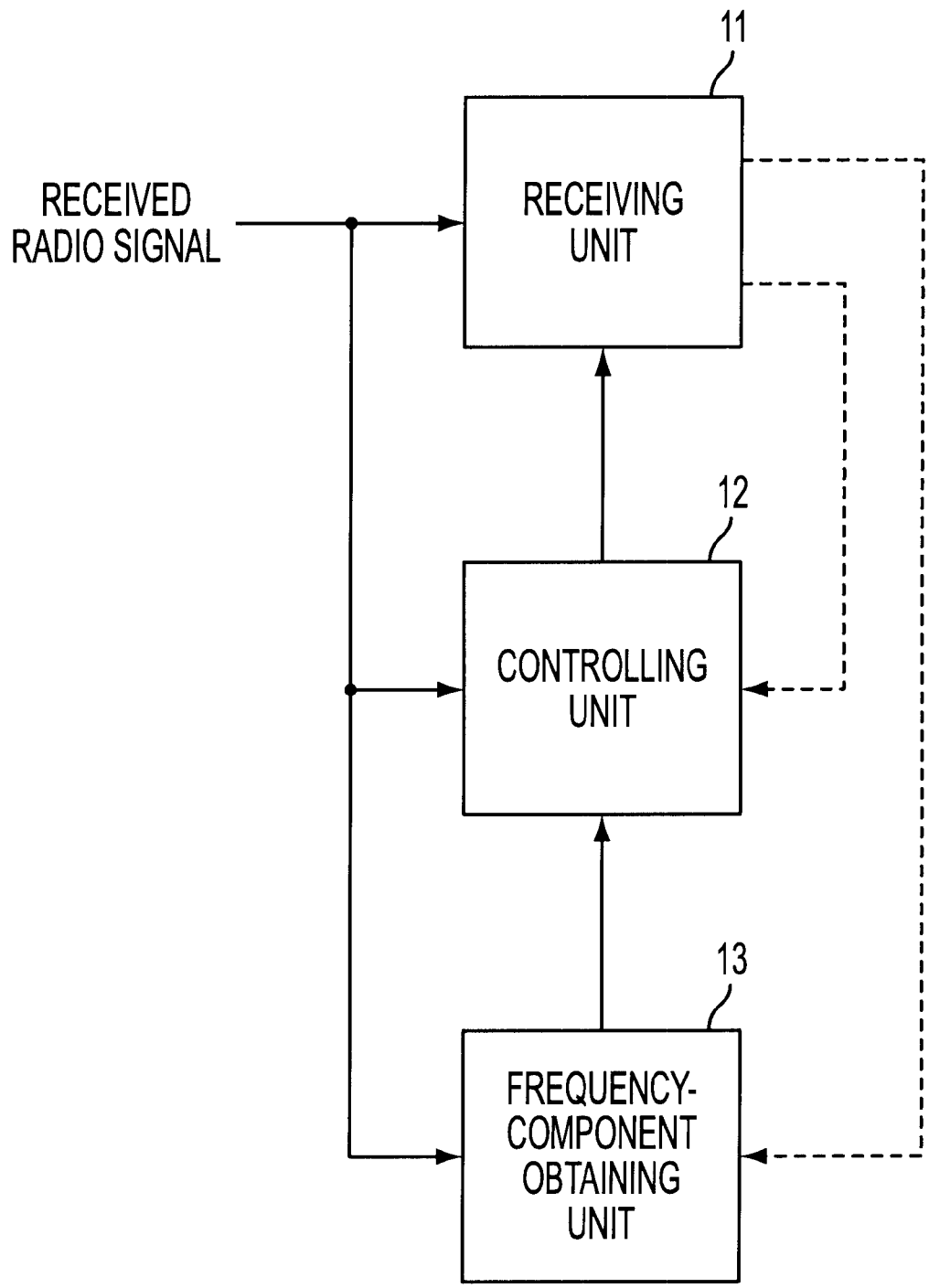
FIG. 2 is a block diagram showing a configuration of a multi-mode communication device according to the principle of the present invention.

FIG. 2 is a block diagram showing a configuration of a multi-mode communication device according to the principle of the present invention.

The multi-mode communication device of FIG. 2 includes a receiving unit 11, a controlling unit 12, and a frequency-component acquisition unit 13. The receiving unit 11 receives a radio signal supplied via a radio-communication path, and attends to reception processing of the received radio signal under an adaptive control. The controlling unit 12, operating in collaboration with the receiving unit 11, performs the adaptive control so as to select a multiplex-attachment scheme appropriate to the received radio signal from a plurality of multiplex-attachment schemes inclusive of a CDMA scheme.

The frequency-component obtaining unit 13 obtains all or part of the frequency components falling within a frequency range of the received radio signal. If the obtained frequency components have a uniform distribution curve, the controlling unit 12 ascertains that the multiplex-attachment scheme appropriate for the received radio signal is the CDMA scheme.

In this manner, a check as to whether the received radio signal complies to the CDMA scheme is made based on a degree to which the frequency spectrum of the received radio signal has a flat (uniform) distribution. A selection of an appropriate multiplex-attachement scheme is thus made more efficiently than in the related art, in which a check to the same effect cannot be made until an attempt to establish synchronization comes to an end with a successful result.

Figure 3:
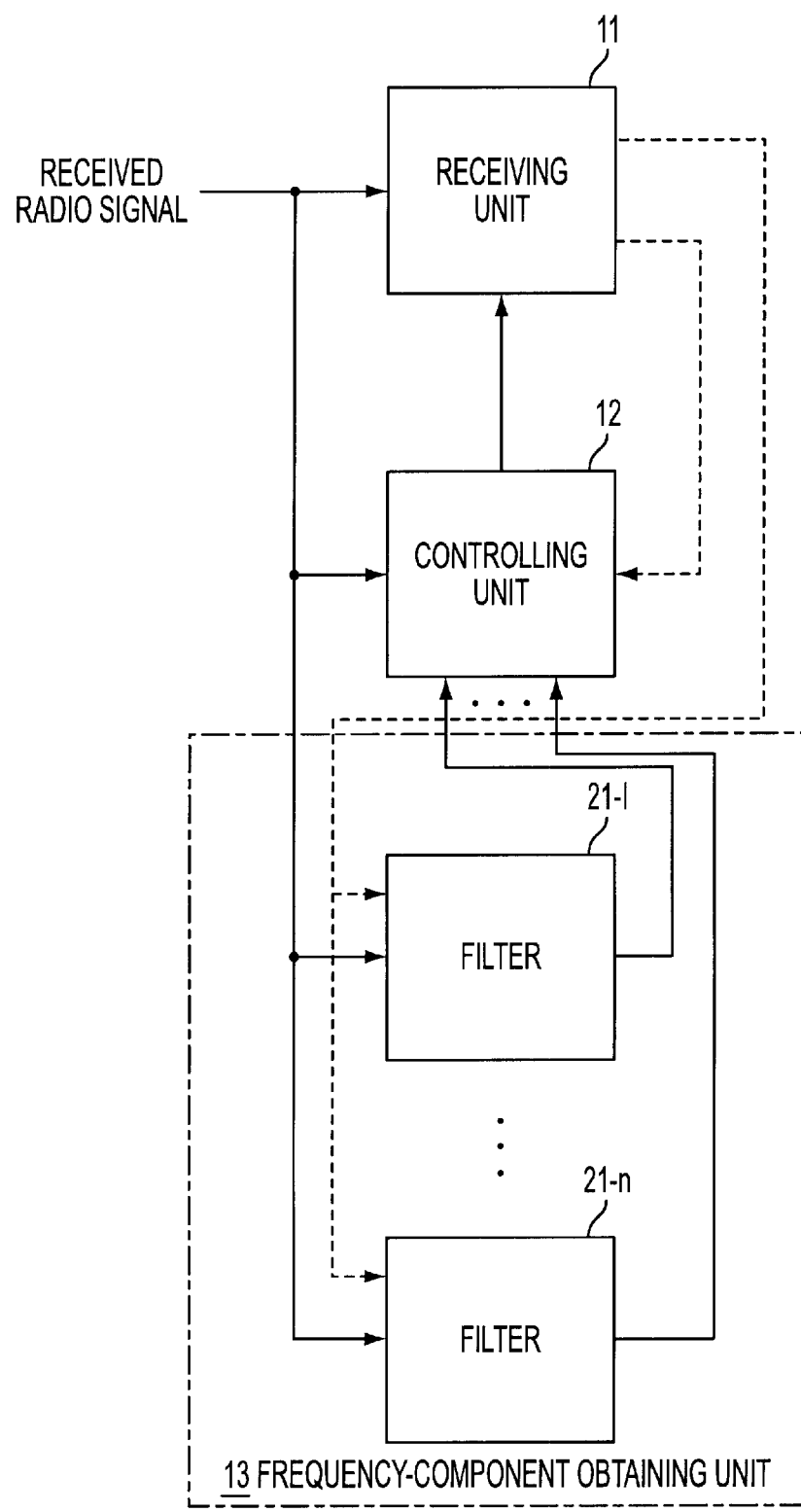
FIG. 3 is a block diagram showing a more detailed configuration of the multi-mode communication device according to the principle of the present invention.

FIG. 3 is a block diagram showing a more detailed configuration of the multi-mode communication device according to the principle of the present invention.

In the multi-mode communication device as shown in FIG. 3, the frequency-component obtaining unit 13 includes a plurality of filters 21-1 through 21-n. The plurality of filters 21-1 through 21-n have a respective frequency band, and a location or a width of the frequency band differs therebetween.

The plurality of filters 21-1 through 21-n apply respective band-pass processing to the received radio signal in a parallel manner. When the received radio signal complies with the CDMA scheme, outputs of the plurality of filters 21-1 through 21-n are substantially proportional to the respective band widths.

The controlling unit 12 checks a variation of ratios by obtaining the ratios of respective output levels of the plurality of filters 21-1 through 21-n to corresponding band widths of the plurality of filters 21-1 through 21-n, and ascertains that the appropriate multiplex-attachment scheme is the CDMA scheme if the variation is smaller than a predetermined threshold.

In this manner, a check as to whether the received radio signal complies to the CDMA scheme is made based on a degree to which the frequency spectrum of the received radio signal has a flat (uniform) distribution, and the degree of flatness is obtained by use of the plurality of filters 21-1 through 21-n having different band widths and/or different band locations. The larger the number of the plurality of filters 21-1 through 21-n and the more uniform the distribution of individual frequency bands within the frequency range of the received radio signal, the more reliable the check will be in determining whether the appropriate multiplex-attachment scheme is the CDMA scheme.

Figure 4:
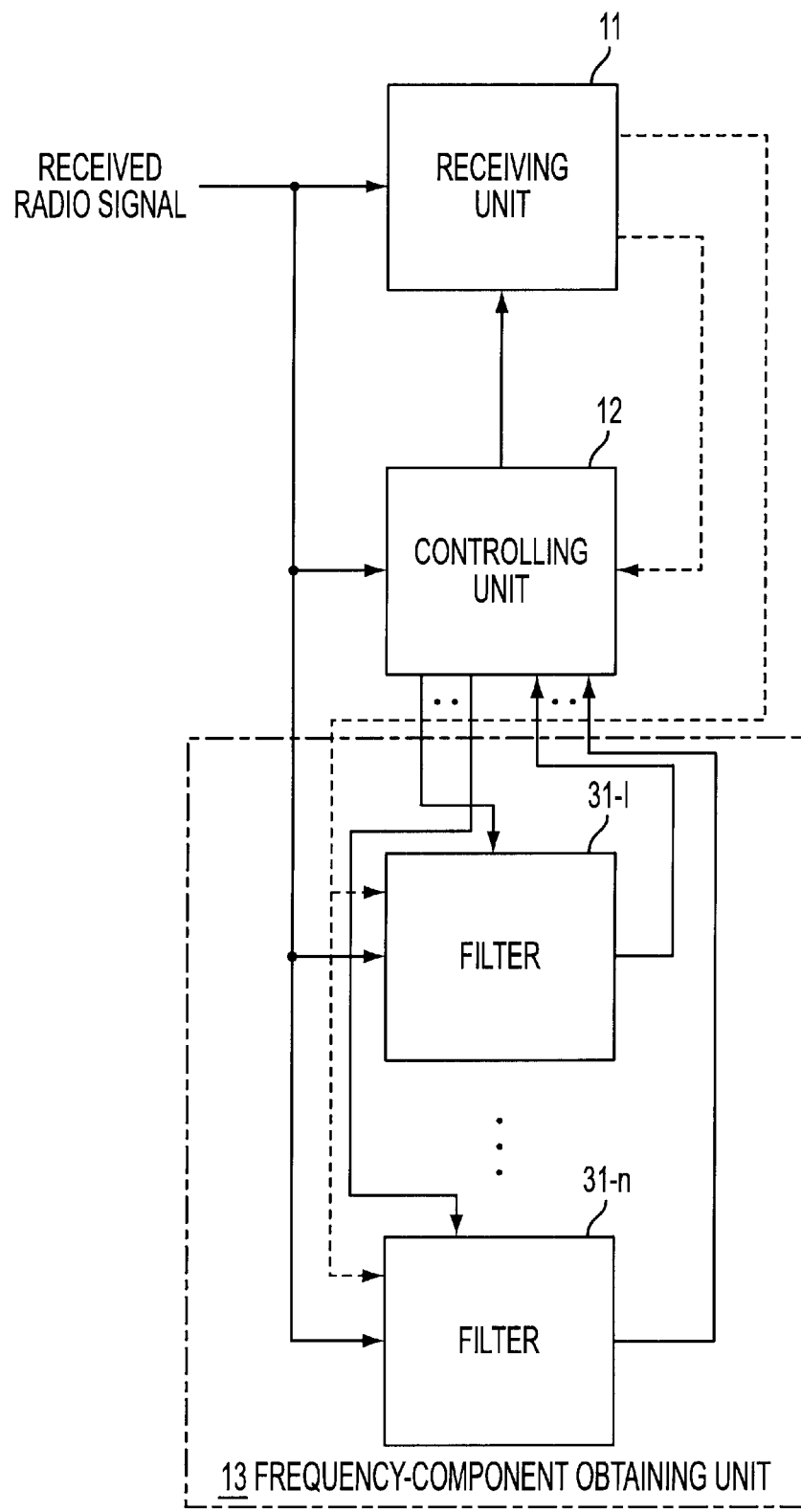
FIG. 4 is a block diagram showing another detailed configuration of the multi-mode communication device according to the principle of the present invention.

FIG. 4 is a block diagram showing another detailed configuration of the multi-mode communication device according to the principle of the present invention.

In the multi-mode communication device as shown in FIG. 4, the frequency-component obtaining unit 13 includes one or more filters 31-1 through 31-n. The filters 31-1 through 31-n have a respective frequency band such that the location and/or the width of the respective frequency band is adjustable.

The filters 31-1 through 31-n apply respective band-pass processing to the received radio signal. When the received radio signal complies with the CDMA scheme, outputs of the filters 31-1 through 31-n are substantially proportional to the respective band widths.

The controlling unit 12 changes at least one of the frequency band and the band width with respect to the filters 31-1 through 31-n within a frequency range corresponding to the CDMA scheme.

Further, the controlling unit 12 ascertains that the appropriate multiplex-attachment scheme is the CDMA scheme if a variation of the output levels of the filters 31-1 through 31-n is smaller than a predetermined threshold level after compensation for a variation of the varying band widths.

In this manner, a check as to whether the received radio signal complies to the CDMA scheme is made based on a degree to which the frequency spectrum of the received radio signal has a flat (uniform) distribution, and the degree of flatness is obtained by use of the filters 31-1 through 31-n having adjustable frequency bands and band widths. The larger the number of the filters 31-1 through 31-n and the more uniform the distribution of individual frequency bands within the frequency range of the received radio signal, the more reliable the check will be in determining whether the appropriate multiplex-attachment scheme is the CDMA scheme.

Figure 5:
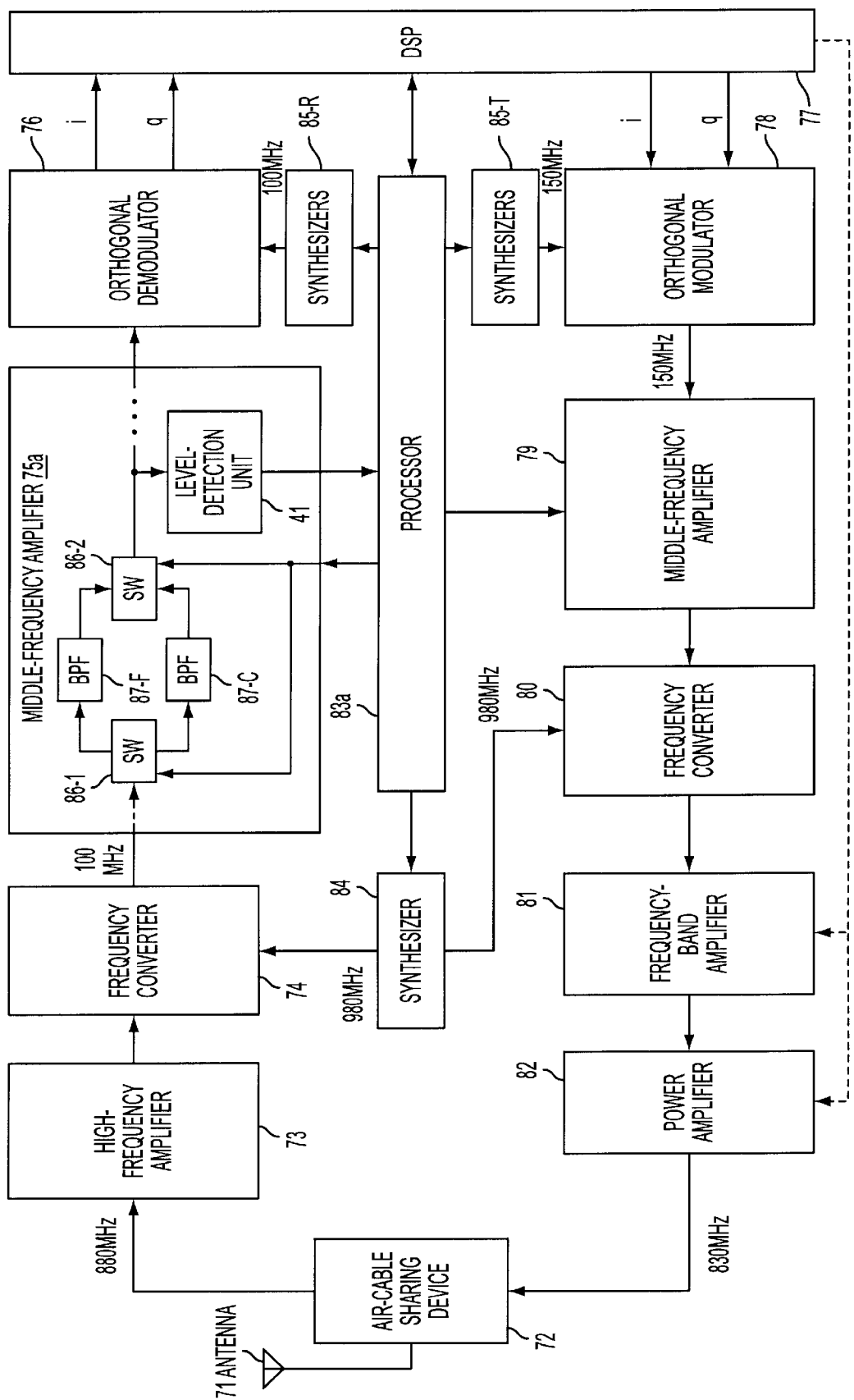
FIG. 5 is a block diagram showing a configuration of a multi-mode communication device according to an embodiment of the present invention.

FIG. 5 is a block diagram showing a configuration of a multi-mode communication device according to an embodiment of the present invention.

Figure 1:
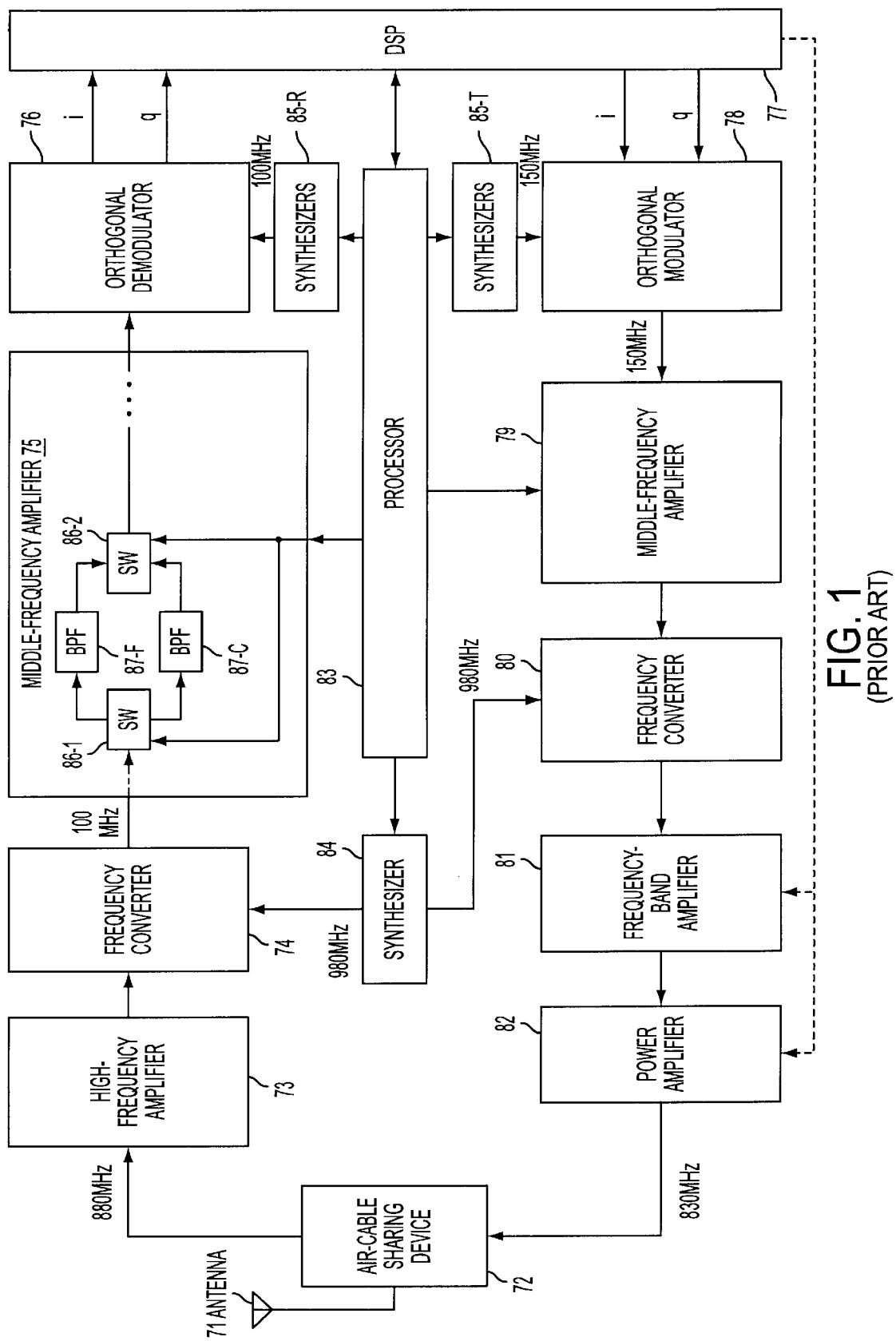
FIG. 1 is a block diagram showing a configuration of a dual-mode-terminal device used in the related art.

In FIG. 5, the same elements as those shown in FIG. 1 are referred to by the same numerals, and a description there of will be omitted. A configuration of FIG. 5 differs from the configuration of FIG. 1 in that a middle-frequency amplifier 75a is provided in place of the middle-frequency amplifier 75, and a processor 83a is provided in place of the processor 83.

The middle-frequency amplifier 75a differs from the middle-frequency amplifier 75 in that a level-detection unit 41 is newly provided and situated between an output of the switch 86-2 and a corresponding input port of the processor 83a.

It should be noted that correspondences between the configuration of FIG. 5 and the configuration of FIG. 2 or FIG. 3 can be found such that the antenna 71, the air-cable sharing device 72, the high-frequency amplifier 73, the frequency converter 74, the middle-frequency amplifier 75a, the orthogonal demodulator 76, the DSP 77, the synthesizers 84 and 85-R, and the processor 83a together correspond to the receiving unit 11, and the level-detection unit 41 corresponds to the frequency-component obtaining unit 13 or the plurality of filters 21-1 through 21-n.

FIGS. 6A through 6C are illustrative drawings for explaining operations of the embodiment of FIG. 5. In the following, the operations of this embodiment will be described with reference to FIG. 5 and FIGS. 6A through 6C.

When the communication device enters an effective range of a radio-communication zone from outside any service area or when the device is switched on, the processor 83a performs the steps of:

a) instructing the DSP 77 to establish a channel in a radio-communication zone corresponding to the CDMA scheme; and b) instructing the synthesizers 84, 85-R, and 85-T to generate a respective radio frequency which is used in establishing the channel corresponding to the CDMA scheme.

Preceding the above-described steps (which are the same as those of the related art), however, the following process is performed.

The processor 83a supplies a binary control signal to the switches 86-1 and 86-2 where the binary control signal inverts a logic value thereof back and forth at constant intervals (=t/2) over a predetermined time period T.

The frequency converter 74 outputs a middle-frequency-range signal in response to a radio wave arriving at the antenna 71 in the same manner as in the related art. The middle-range-frequency signal is supplied to one of the band-pass filters 87-F and 87-C selected in turn when the switches 86-1 and 86-2 switch back and forth in accordance with the logic value of the binary control signal described above, and, then, is supplied to the level-detection unit 41.

The level-detection unit 41 measures a power level of the middle-frequency-range signal at respective timings as shown in FIG. 6A The processor 83a stores the detected level of the middle-frequency-range signal as a series of values $P_L(i)$ and a series of values $P_H(i)$ at respective points i in a time dimension such that these series respectively correspond to the logic value LOW and the logic value HIGH of the binary control signal.

Further, the processor 83a obtains an average $P_{LA}$ of the values $P_L(i)$ and an average $P_{HA}$ of the values $P_H(i)$. The processor 83a then checks whether the following equation is satisfied:

$$P_{LA}/P_{HA} = W_F/W_C \pm d$$

where $W_F$ is a band width (e.g., 30 kHz) of the band-pass filter 87-F, and $W_C$ is a band width (e.g., 2 MHz) of the band-pass filter 87-C. These band widths are provided for the processor 83a in advance as specified values. Further, d represents a tolerable error. The above equation requires that the ratio of the averages be nearly equal to the ratio of the band widths within the tolerable error d.

A frequency spectrum of the received radio signal should be substantially uniform in a frequency dimension as shown in FIG. 6B when the received radio signal corresponds to the CDMA scheme. In this case, therefore, the ratio of $P_{LA}$ to $P_{HA}$ should be substantially equal to the ratio of $W_F$ to $W_C$.

On the other hand, when the received radio signal corresponds to the FDMA scheme, the frequency spectrum thereof is comprised of radio-communication channels sparsely distributed in a frequency dimension as shown in FIG. 6C. Here, both side bands of each carrier frequency contain frequency components greatly varying in intensity thereof, and a constant transmission is not made with respect to a given channel for voice communication unless this channel is assigned to a completed call.

Accordingly, the above-identified equation is not satisfied when the band width of the band-pass filter 87-C is broader than an interval between radio frequencies.

If the above-identified equation is satisfied, it is highly likely that the CDMA scheme is being employed in the corresponding radio-communication zone. The processor 83a thus starts the steps a) and b) presented earlier. If the equation is not satisfied, on the other hand, it is highly unlikely that the CDMA scheme is used in the corresponding radio-communication zone. In this case, the processor 83a instructs the DSP 77 to start establishing a channel corresponding to another scheme other than the CDMA scheme. Also, the processor 83a gives an instruction to the switches 86-1 and 86-2 to use the band-pass filter 87-F in amplifying the middle-frequency-range signal supplied from the frequency converter 74.

As described above, this embodiment of the present invention has the level-detection unit 41 newly provided in addition to the related-art configuration, and has different processing performed by the processor 83a, thereby making a reliable and speedy check as to whether the CDMA scheme is employed in a given radio-communication zone.

In comparison with the related-art configuration in which such a check is performed as a trial and an error in the course of establishing synchronism, the present invention can make an efficient shift into a waiting status without incurring a cost increase when entering a service area or when being switched on.

In this embodiment, however, if all the communication channels of the FDMA scheme or the TDMA scheme are assigned to calls of one kind or another, and constant transmission is engaged with respect to all of these channels, then, the check described above may not give a reliable answer.

In a mobile-communication system employing the FDMA scheme or the TDMA scheme, a certain measure is generally taken to avoid crosstalk caused by mutual modulation that may occur when terminals transmitting signals are located close to the radio-communication station. This measure may assign adjacent communication zones in a frequency domain to geographically different communication zones or sectors which are distanced from each other, rather than assigning the adjacent frequency communication zones to the same geographical communication zone or sector.

Accordingly, the wider the band width of the band-pass filter 87-C in comparison with the cannel interval, the more reliable the result of the check will be.

In this embodiment, a check as to whether the frequency spectrum of the received radio signal is uniform is made by the level-detection unit 41 operating under the control of the processor 83a. Another configuration can be used to make the same check as will be described below.

Figure 7:
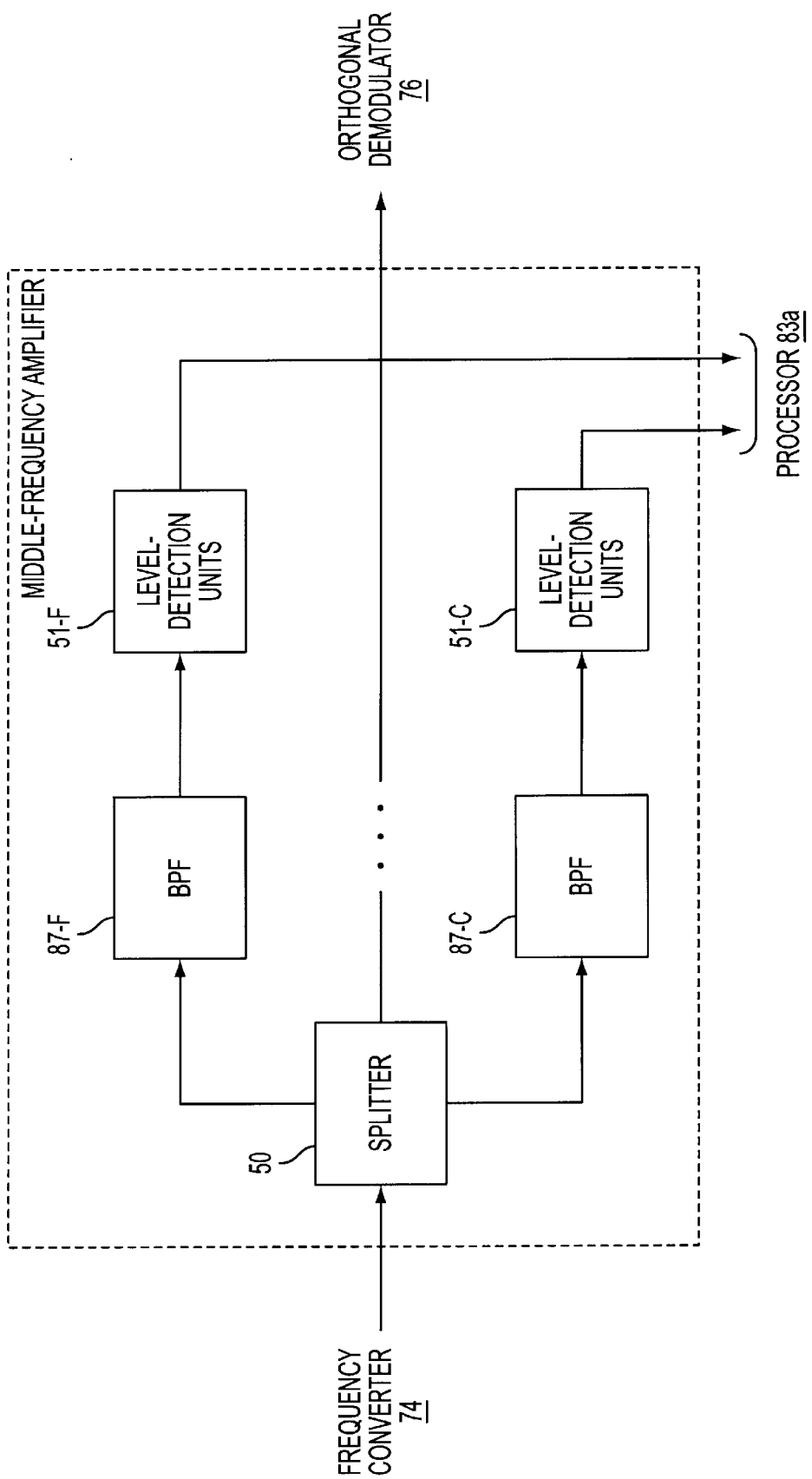
FIG. 7 is a block diagram showing a configuration of a middle-frequency amplifier.

FIG. 7 is a block diagram showing another configuration of the middle-frequency amplifier 75a. In FIG. 7, a splitter 50 is provided in place of the switch 86-1. The band-pass filters 87-F and 87-C are connected to two of the three outputs extending from the splitter 50, respectively. Further, the switch 86-2 is removed in this configuration. Level-detection units 51-F and 51-C are respectively connected to outputs of the band-pass filters 87-F and 87-C, replacing the level-detection unit 41. In this configuration, the processor 83a can obtain the ratio of the averages of signal levels after the signal levels are measured by the level-detection units 51-F and 51-C.

This embodiment, further, makes use of the band-pass filters 87-F and 87-C that are pre-existing in the related-art configuration. It is apparent, however, that separate filters may be provided rather than utilizing the existing filters when increases in hardware and power consumption are permitted while a sufficient margin is insured with regard to circuit density and heat-generation consideration.

Moreover, in the present embodiment, the values $P_L(i)$ and $P_H(i)$ are obtained with respect to timings i, and the averages of these values are thereafter calculated. Then, the ratio of the averages is compared to the ratio of the band width $W_F$ of the band-pass filter 87-F to the band width $W_C$ of the band-pass filter 87-C. Alternatively, a ratio of $P_L(i)$ to $P_H(i)$ may be calculated with respect to each of the timings i, and, then, an average of these ratios may be subjected to comparison with the ratio of the band width $W_F$ of the band-pass filter 87-F to the band width $W_C$ of the band-pass filter 87-C.

Figure 8:
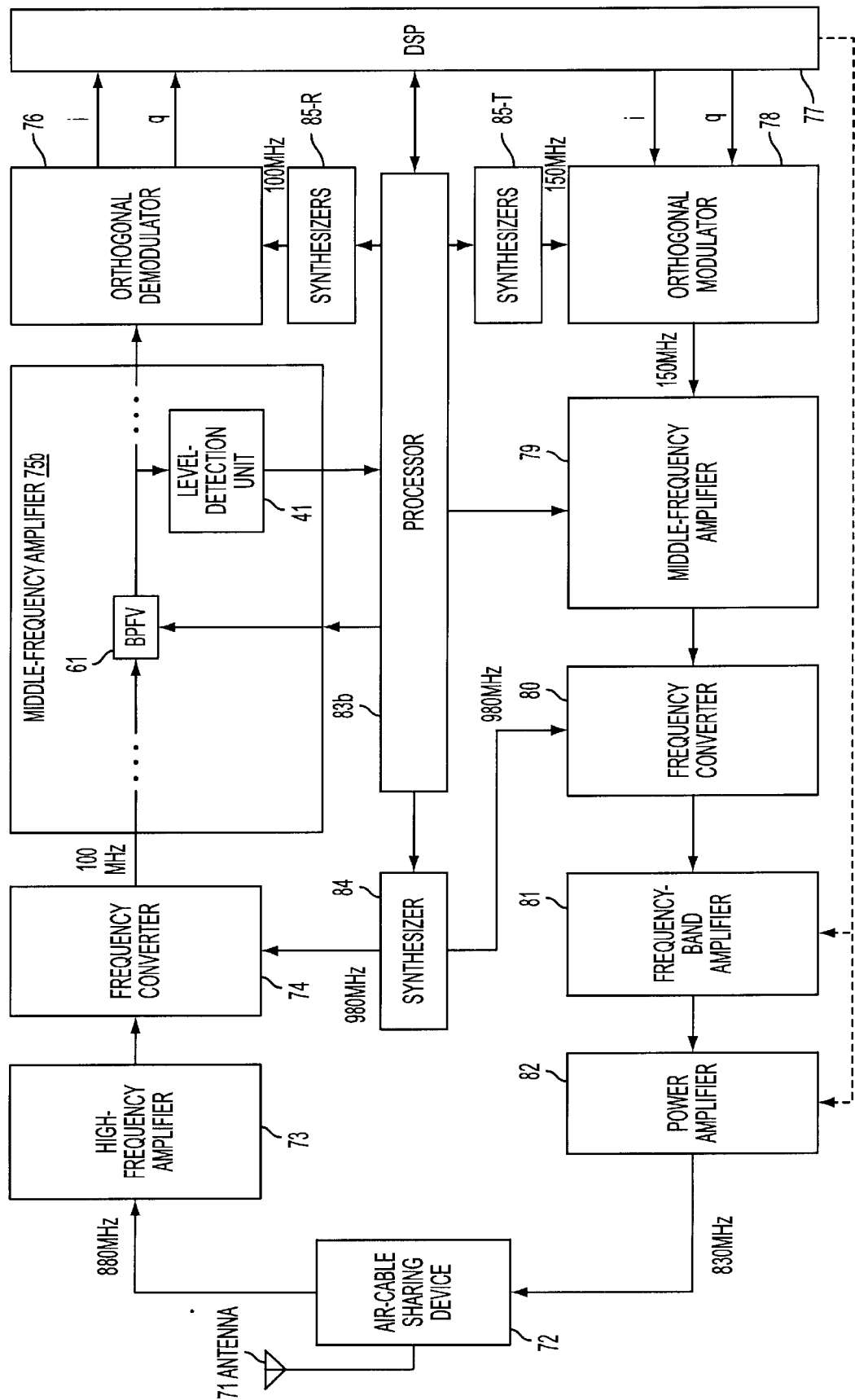
FIG. 8 is a block diagram showing a configuration of a multi-mode communication device according to another embodiment of the present invention.

FIG. 8 is a block diagram showing a configuration of a multi-mode communication device according to another embodiment of the present invention.

The embodiment of FIG. 8 differs from the embodiment of FIG. 5 in that a middle-frequency amplifier 75b is provided in place of the middle-frequency amplifier 75a, and a processor 83b replaces the processor 83a.

The middle-frequency amplifier 75b differs from the middle-frequency amplifier 75a of FIG. 5 in that a single variable-band-pass filter 61 is provided in place of the band-pass filters 87-F and 87-C, and the switches 86-1 and 86-2 are removed. That is, the variable-band-pass filter 61 takes an input thereof and supplies an output thereof without use of the switches 86-1 and 86-2. Further, the variable-band-pass filter 61 has a control input thereof connected to a fourth output port of the processor 83b.

Correspondences between the embodiment of FIG. 8 and the configuration of FIG. 2 or FIG. 4 can be found such that the variable-band-pass filter 61 corresponds to the plurality of filters 31-1 through 31-n. Other than this, correspondences are the same as those found for the embodiment of FIG. 5.

FIGS. 9A and 9B are illustrative drawings for explaining operation of the embodiment of FIG. 8.

In what follows, operations of this embodiment will be described with reference to FIG. 8 and FIGS. 9A and 9B.

The processor 83b sets the band width of the variable-band-pass filter 61 to such a band width as to correspond to the CDMA scheme or the FDMA (or TDMA) scheme.

When the device is entering an effective range of a radio-communication zone from outside any service area or when the device is switched on, the processor 83b performs the following process prior to the steps a) and b) previously described.

As shown in FIG. 9A, the processor 83b sets the band width of the variable-band-pass filter 61 to a predetermined width B, and sweeps the frequency band of the variable-band-pass filter 61 over the entirety or part of the frequency range in which the received radio signal corresponding to the CDMA scheme has a spectrum distribution.

The level-detection unit 41 obtains levels of the received radio signal supplied from the variable-band-pass filter 61 as the frequency band of the variable-band-pass filter 61 sweeps over the prescribed frequency range. Then, the level-detection unit 41 checks whether the obtained levels are constant within a predetermined tolerance level as shown in FIG. 9B.

If the result of the check is affirmative, the processor 83b ascertains that the CDMA scheme is likely to be being used in the corresponding radio-communication zone. In this case, the processor 83b makes appropriate settings to the frequency band and band width of the variable-band-pass filter 61 so as to conform to the CDMA scheme. The steps a) and b) previously described are then performed.

If the result of the check is negative, on the other hand, it is fair to assume that the CDMA scheme is unlikely to be being used in the corresponding radio-communication zone. In this case, the processor 83b make settings to the band width and frequency band of the variable-band-pass filter 61 so as to comply with the FDMA scheme (or TDMA scheme). Further, as in the related art, the processor 83b instructs the DSP 77 to start establishing synchronism in accordance with the FDMA scheme (or TDMA scheme).

As described above, this embodiment is provided with the variable-band-pass filter 61 replacing the switches 86-1 and 86-2 and the band-pass filters 87-F and 87-C used in the related art, and the processor 83b appropriately controls the frequency band and band width of the variable-band-pass filter 61. In this configuration, a reliable and speedy check can be made as to whether the CDMA scheme is employed in a given radio-communication zone, and an efficient shift into a waiting status can be made when the device newly enters a service area or when the device is switched on.

The present embodiment has been described with reference to a particular example in which only the frequency band of the variable-band-pass filter 61 is changed during a process of obtaining power levels for the check purpose. Alternatively, only the band width of the variable-band-pass filter 61 may be changed so as to extend over the entirety or part of the frequency range when the received radio signal complying with the CDMA scheme occupies such a frequency range.

FIGS. 10A through 10C are illustrative drawings showing such an example in which the frequency band of the variable-band-pass filter 61 is changed. As shown in FIGS. 10B and 10C, the power levels obtained by the level-detection unit 41 are checked if these power levels are in proportion to the respective band widths B within a tolerable margin.

Where the processor 83b can keep track of the band widths B of the variable-band-pass filter 61 accurately, the band width B as well as the frequency band of the variable-band-pass filter 61 may be changed under the control of the processor 83b, so that a check is made as to whether a ratio of each band width B to a corresponding power level obtained by the level-detection unit 41 falls within a given tolerable range.

Further, the present embodiment performs the above-described check based on prior knowledge of the spectrum arrangements of the CDMA scheme and other multiple-attachment schemes. When frequency ranges not used for transmission or frequency ranges not employed in a given zone are not constant with regard to the multiplex-attachment schemes, and if prior knowledge of such frequency ranges are given, then, the frequency band of the variable-band-pass filter 61 may be positioned to cover such frequency ranges with an aim of enhancing a reliability of the check.

In the above embodiment, no specific examples are not given with regard to the band widths W of the band-pass filters 87-F and 87-C and the variable-band-pass filter 61. When an interval between adjacent radio frequencies is constant and known with regard to the FDMA (or TDMA) scheme, however, the band widths W may be set to a width that is not equal to a multiple of this interval.

Figure 11:
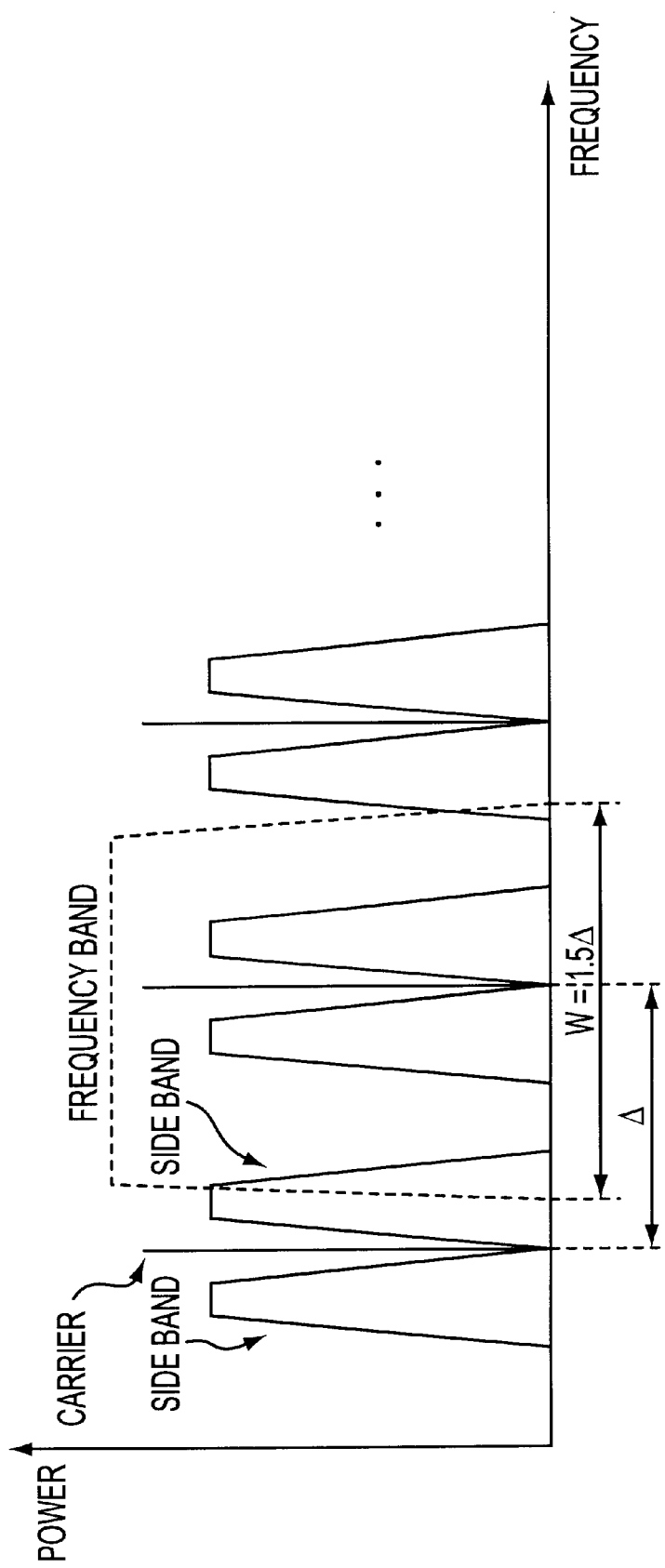
FIG. 11 is an illustrative drawing showing a configuration of a band width which is not equal to a multiple of a frequency interval.

In this manner, the fact that side bands of the FDMA scheme (or TDMA scheme) have nonuniform distribution in the frequency domain is positively utilized, thereby enhancing the reliability of the check. FIG. 11 is an illustrative drawing showing a configuration of the band width W which is not equal to a multiple of the frequency interval.

Further, when adjacent radio frequencies of the FDMA scheme (or TDMA scheme) in the frequency domain are not assigned to the same radio-communication zone because of adoption of an interleave scheme, the band width of the band-pass filters 87-F and 87-C and the variable-band-pass filter 61 may be set in a special manner as described below.

Figure 12:
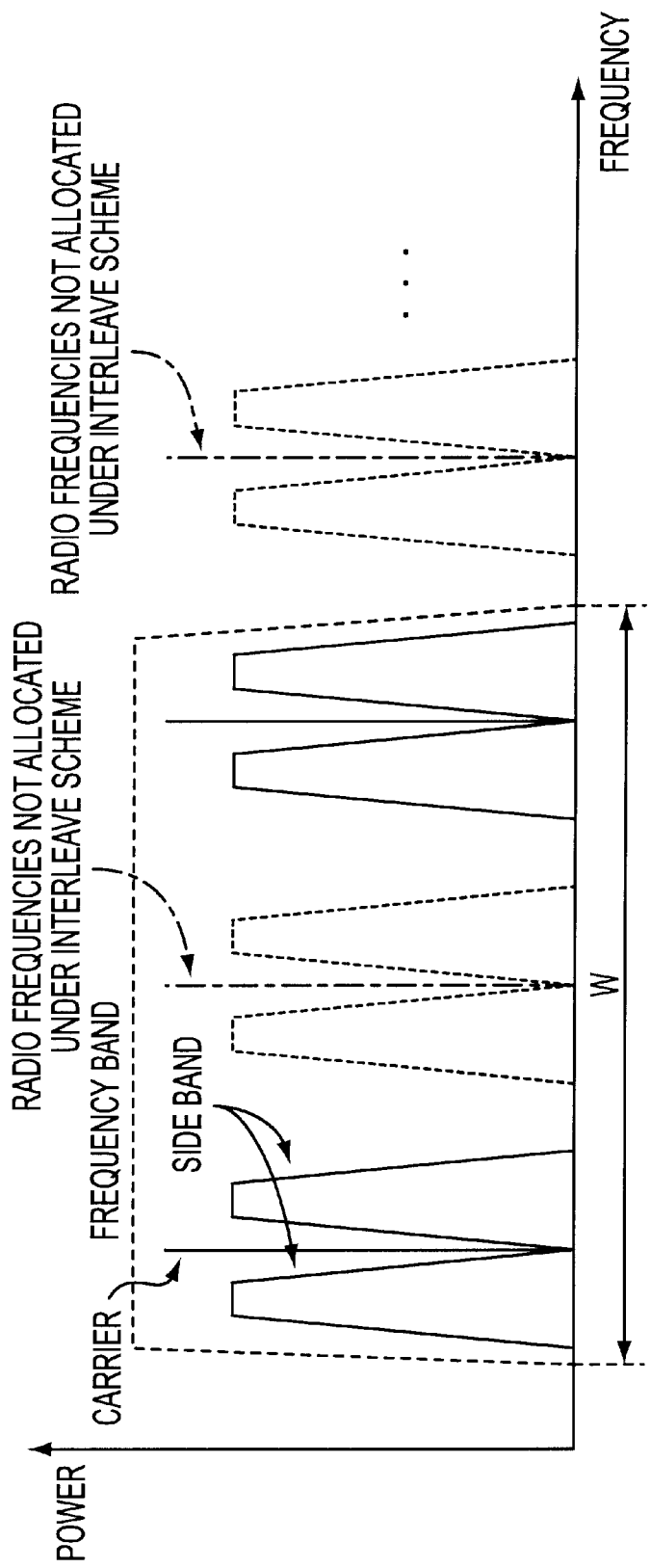
FIG. 12 is an illustrative drawing showing a setting of the band width when an interleave scheme is employed.

FIG. 12 is an illustrative drawing showing a setting of the band width when an interleave scheme is employed.

As shown in FIG. 12, the band width of the band-pass filters 87-F and 87-C and the variable-band-pass filter 61 is set such that the number of the assigned frequencies covered within this band range is different from the number of frequencies not assigned within this band range. In this manner, the fact that radio frequencies are not assigned to every assignable position within a single radio-communication zone or sector is positively utilized, thereby enhancing the reliability of the check.

Further, when the above-described interleave scheme is employed in the frequency arrangement of the FDMA scheme (or TDMA scheme), the frequency band of the band-pass filters 87-F and 87-C and the variable-band-pass filter 61 may be set in a special manner as described below.

FIG. 13 is an illustrative drawing showing a setting of the frequency band when an interleave scheme is employed.

As shown in FIG. 13, the frequency band of the band-pass filters 87-F and 87-C and the variable-band-pass filter 61 is set so as to cover only an upper side band of a given radio frequency and a lower side band of a next radio frequency on the higher-frequency side. In this manner, the fact that radio frequencies are not assigned to every assignable position within a single radio-communication zone or sector is positively utilized, thereby enhancing the reliability of the check.

In the various embodiments described above, the frequency band of the band-pass filters 87-F and 87-C and the variable-band-pass filter 61 is positioned such that it covers a range where the frequency spectrum of the received radio signal complying to the CDMA scheme is distributed. This frequency band may be set so as to cover all the frequency range which is shared by both the received radio signal of the CDMA scheme and the radio signal of the FDMA scheme (or TDMA scheme), thereby enhancing the reliability of the check. FIGS. 14A through 14C are illustrative drawings showing a configuration in which the frequency band covers a frequency range covered by the CDMA scheme and the FDMA (CDMA) scheme.

In the embodiments described above, a description has been given with reference to an example in which only a received radio signal generated by a direct-sequence scheme is considered a radio signal complying with the CDMA scheme. If the frequency spectrum is known in advance, however, the present invention is equally applicable to any received radio signal, whether it complies with a frequency hopping scheme, a time hopping scheme, or a hybrid scheme combining these schemes.

Further, the above embodiment has been described in which the present invention is applied to a terminal device of a mobile communication system. Applicability of the present invention, however, can be found under other circumstances in which automatic communication control is required in order to cope with a combination of all or part of the CDMA scheme and other multiplex-attachment schemes (including not only the FDMA scheme and the TDMA scheme but also space-division-multiplex-attachment scheme). The present invention is thus applicable, for example, to a communication device installed on a satellite communication station or an earth station for establishing a communication path via such a satellite communication station.

Also, the embodiments described above is based on an assumption that either the CDMA scheme or another multiplex-attachment scheme is selectively used for establishing a radio-communication zone. Applicability of the present invention is thus warranted even when a radio-communication zone is established in a different frequency range.

In the embodiment described above, further, only one of each of the band-pass filters 87-F and 87-C and the variable-band-pass filter 61 is provided. If accuracy of the check and a speed of the check can be improved, a plurality of filters may be provided with respect to each of these filters as long as increases in the size of hardware and software, power consumption, etc., are within an acceptable range.

According to the present invention as described above, a multiple-attachment scheme appropriate for a received radio signal is selected more efficiently than it is in the related art.

The larger the number of filters and the more uniform the distribution of the frequency bands of the filters within a frequency range occupied by the received radio signal of the CDMA scheme, the more reliable of the check as to whether the CDMA scheme is appropriate as a multiplex-attachment scheme for the received signal.

Further, the present invention provides measures to enhance a reliability of the check for discriminating the CDMA scheme from other multiplex-attachement schemes.

Moreover, the present invention is not subjected to severe restrictions in terms of cost, power consumption, mechanical size, thermal design, etc., in implementation thereof.

Accordingly, a communication system employing the present invention can establish a communication path swiftly by adapting to a selected one of the multiplex-attachment schemes when entering a new service area or being switched on, thereby rendering better service to users.

Further, the present invention is not limited to these embodiments, but various variations and modifications may be made without departing from the scope of the present invention.

What is claimed is:

1. A multi-mode communication device, comprising:
a receiving unit which receives a radio signal via a radio communication path, and processes the received radio signal;
a frequency-component obtaining unit which obtains frequency components in all or part of a frequency range of the received radio signal; and
a controlling unit which selects a multiple-access scheme appropriate for the received radio signal from a plurality of applicable multiple-access schemes by controlling said receiving unit, said controlling unit selecting a CDMA scheme as the multiple-access scheme in response to detecting a substantially uniform distribution of the frequency components obtained by said frequency-component obtaining unit.

2. The multi-mode communication device as claimed in claim 1, wherein said frequency-component obtaining unit includes a plurality of filters having frequency bands in a frequency range corresponding to the CDMA scheme such that at least one of the frequency bands and band widths thereof are different from each other, and passes the received radio signal through said plurality of filters to obtain levels of the frequency components, and wherein said controlling unit checks whether to select the CDMA scheme based on whether ratios of the respective levels of the frequency components to the band widths of the corresponding filters are substantially the same within a predetermined tolerable range.

3. The multi-mode communication device as claimed in claim 2, wherein all or part of said plurality of filters have a respective band width that is not equal to a multiple of a frequency interval at which radio frequencies are allocated in a multiple-access scheme that is not the CDMA scheme.

4. The multi-mode communication device as claimed in claim 2, wherein all or part of said plurality of filters have a respective band width in which a number of first radio frequencies allocated to a given zone is different from a number of second radio frequencies not allocated to the given zone when the first and second radio frequencies together constitute a frequency arrangement of a multiple-access scheme that is not the CDMA scheme.

5. The multi-mode communication device as claimed in claim 2, wherein all or part of said plurality of filters have a respective band width which covers side bands of radio frequencies used by a multiple-access scheme that is not the CDMA scheme, but does not cover the radio frequencies themselves.

6. The multi-mode communication device as claimed in claim 2, wherein the frequency bands of said plurality of filters together cover a frequency range which is shared by said plurality of applicablemultiple-access schemes.

7. The multi-mode communication device as claimed in claim 2, wherein all or part of said plurality of filters are used in establishing synchronism for the CDMA scheme.

8. The multi-mode communication device as claimed in claim 1, wherein said frequency-component obtaining unit includes at least one filter, of which at least one of a frequency band and a band width is variable, and passes the received radio signal through said at least one filter, and wherein said controlling unit changes at least one of the frequency band and the band width of said at least one filter within a frequency range corresponding to the CDMA scheme to obtain respective levels of the frequency components, and checks whether to select the CDMA scheme based on whether the respective levels of the frequency components indicate a substantially uniform distribution of the frequency components.

9. The multi-mode communication device as claimed in claim 8, wherein said controlling unit sets the band width of said at least one filter to be not equal to a multiple of a frequency interval at which radio frequencies are allocated in a multiple-access scheme that is not the CDMA scheme.

10. The multi-mode communication device as claimed in claim 8, wherein said controlling unit sets the band width of said at least one filter to such a band width in which a number of first radio frequencies allocated to a given zone is different from a number of second radio frequencies not allocated to the given zone when the first and second radio frequencies together constitute a frequency arrangement of a multiple-access scheme that is not the CDMA scheme.

11. The multi-mode communication device as claimed in claim 8, wherein said controlling unit sets the band width of said at least one filter such that the band width covers side bands of radio frequencies used by a multiple-access scheme that is not the CDMA scheme, but does not cover the radio frequencies themselves.

12. The multi-mode communication device as claimed in claim 8, wherein said controlling unit changes at least one of the frequency band and the band width of said at least one filter so as to cover in effect an entirety of a frequency range which is shared by said plurality of applicable multiple-access schemes.

13. The multi-mode communication device as claimed in claim 8, wherein said at least one filter is used in establishing synchronism for the CDMA scheme.

* * * * *